July 1, 1930.  C. W. RICE  1,769,463

DETECTOR

Original Filed July 23, 1928

R. A. Thomas

WITNESS:

C. W. Rice  INVENTOR

BY Victor J. Evans

ATTORNEY

Patented July 1, 1930

1,769,463

UNITED STATES PATENT OFFICE

CYRUS WILLIAM RICE, OF PITTSBURGH, PENNSYLVANIA

DETECTOR

Application filed July 23, 1928, Serial No. 294,642. Renewed January 23, 1930.

The object of this invention is to provide means for detecting the destructive and scale depositing properties of water or steam, by permitting action of the fluid on a special element of metal inserted into a steam duct, main, or water container, in the special manner herein disclosed, the detecting device being adapted for withdrawal for examination regarding the above mentioned properties of the fluid and for the purpose of determining the nature of deposits when formed on the detecting device.

A further object is to employ detecting elements of particular kinds, and especially elements formed of zinc, or brass containing zinc, or formed of aluminum.

A further object is to provide an element especially formed or constructed and mounted for withdrawal as indicated above, but having such configuration that impurities in fluid or super-heated steam will be trapped, and the elements in which they are collected may be conveniently withdrawn while pressure is maintained, and without permitting of the escape of fluid.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1:
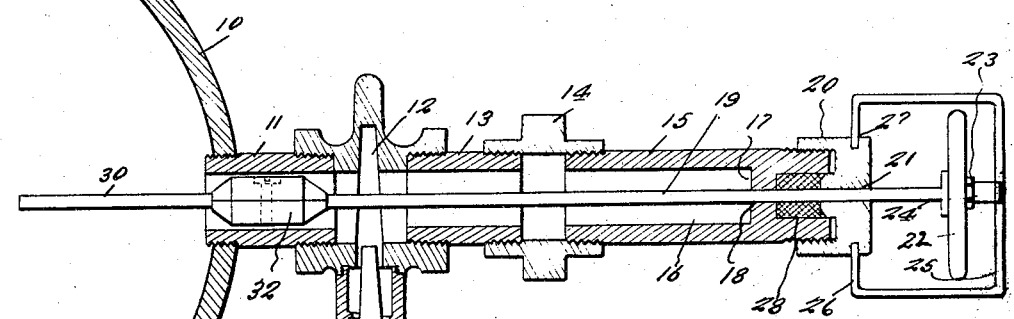
Figure 1 is a view of the detecting device in longitudinal section.
Figure 2:
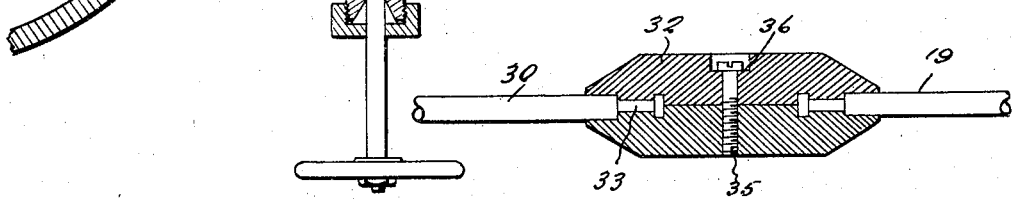
Figure 2 is a detail in longitudinal section through the element which mounts the detachable detecting device per se.

In my co-pending application filed June 15, 1927, Serial Number 199,048, I have shown and described means for mounting a scale and corrosion detector, and in the present case a portion of the construction corresponds with that already disclosed but the detecting element per se is mounted by means of a connecting device differently formed, and the novelty resides chiefly in the particular detecting devices employed in the element for directly mounting the devices, and in one form the novelty pertains to the screen construction referred to more in detail below.

A feed line or steam main is designated 10, and a nipple 11 is threaded into an opening in the line, and is also threaded into the housing or casing of valve 12. This housing has threaded connection with nipple 13, and a pipe union or coupling 14 connected with nipple 13 also has connection with tubular element 15 providing a chamber therein as shown at 16.

The tubular element 15 has an inner portion providing a reduced bore, this part being designated 17, and the bore being shown at 18, permitting of the free passage therethrough of rod 19. The cap 20 is threaded into the end of tubular member 15, and is provided with a central bore 21 for the free passage therethrough of rod 19. This element last named is controlled by a hand wheel 22 retained in position by a threaded element 23 having a cutaway portion or channel 24 therein, for the reception of a bail-like member 25, which may also be termed a yoke or U-member. The element 25 has inwardly turned ends 26 adapted for reception within the openings 27 in opposite sides of the cap 20, and the element 25 when in operative position retains rod 19 in an inner position, for the purpose indicated below. A packing box is designated 28 and serves an obvious purpose.

The detector or detector rod is designated 30, and is mounted in a two-part coupling 32, comprising a plurality of sections meeting in a plane through which the longitudinal axis of the device 30 passes, the rod 19 being in alignment with element 30. Each of these elements 30 and 19 is provided with a reduced portion 33, whereby a plurality of annular shoulders are produced, these shoulders engaging a reduced portion of a socket formed in each end of the element 32. It will be observed that each of the sections of the device 32 contains a grooved or channeled portion, and that oppositely located channeled portions form the complete socket at each end. The sections of the mounting device thus produced are held together by means of a screw or other securing device designated 35, the head being countersunk as shown at 36. The element 32 is of insulating material, so that no galvanic action will be set up between the elements 30 and 32, as might otherwise be the case.

The detecting element 30 will be of zinc, brass containing zinc, or aluminum, other metals or alloys being employed if desired but the investigator will select a metal subject to partial destruction, with deposit thereon of the impurities which it is believed may be found to exist in the fluid, or held in suspension thereby.

Figures 3, 4:
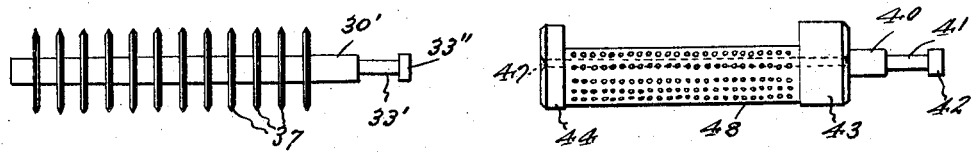
Figure 3 is a view in elevation showing one form of detecting device.
Figure 4 is a view in elevation showing a device adapted to entrap impurities in super-heated steam, etc.

In the form shown in Figure 3, the detector includes a rod 30' having a reduced portion 33' and an end portion 33''. This form of the device includes flanges or the like designated 37, employed for the purpose of greatly increasing the surface subject to action. It will of course be understood that the bore of the nipple 11 is of sufficient diameter to permit of the withdrawal of the structure of Fig. 3 in the same manner in which the element 30 is to be withdrawn.

The rod 19, coupling 32 and detector elements 30 or 30' are slidable outwardly when the device is to be removed for the purpose of determining the effect of impurities contained in the water or steam. When the retaining element or yoke 25 has been freed from the element 24, rod 19 and the connected elements are moved outwardly beyond the valve 12, which is then to be closed and the coupling 32 and the detector per se carried thereby pass into the chamber 16 of element 15.

The coupling or union 14 is detached, and the structure at the right of Fig. 1 may then be handled independently by the investigator, and the detector 30 or 30' removed from coupling 32, for examination for the purpose indicated. The examination will produce a correct result, since the element 30 or 30' should alone be subject to destructive effect or to deposits thereon, the element 32 being of non-corrosive material.

Figure 5:
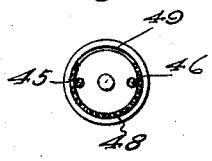
Figure 5 is a transverse section through the structure of Figure 4.

In Figure 4, and also in Figure 5, I have shown a screen detector for obtaining from steam, any material carried thereby as an impurity,—the screen detector to be withdrawn in the manner described, for examination of the material in order to determine the conditions existing in the steam or in the steam main or container.

A rod 40 is provided with a reduced portion 41 and a head 42, as before, and an end member 43 is connected with an opposite end member 44 by rods 45 and 46, the ends of which may be headed as shown at 47.

The screen 48 may be of semi-circular form in cross-section, or approximately so, the element shown in the drawing being of somewhat greater extent, and an opening is provided at 49, on one side, so that the steam carrying the impurities may enter and pass out through the perforations or openings in the opposite side or in the screen per se. The impurities will be retained, and the entire screen detector, as shown in Figures 4 and 5 will be removed as in the case of the element 30 previously referred to.

I claim:—

1. In a device of the class described, a tubular element for connection with a steam main or the like, a valve connected with said element, a second tubular element connected with the valve and having one end closed, a rod movable longitudinally of the tubular elements, a detecting element adapted to extend into the steam main or the like, a coupling, including means for producing interlocking connection between said rod and detecting element, and independently of rotary movement of the rod and detecting element.

2. In a device of the class described, a tubular element for connection with a steam main or the like, a valve connected with said element, a second tubular element connected with the valve and having one end closed, the opposite end being detachable from the valve, a rod movable longitudinally of the tubular elements, and means carried by the rod and adapted to intercept impurities carried by the fluid contacting therewith, said means carried by the rod including spaced plate-like portions.

3. In a device of the class described, a tubular element for connection with a steam main or the like, a rod movable longitudinally of the tubular element, and a perforated element carried by the rod and adapted to intercept impurities carried by fluid contacting therewith.

4. In a device of the class described, a tubular element for connection with a steam main or the like, a rod movable longitudinally of the tubular element, and a cage-like element carried by the rod and adapted to intercept impurities carried by fluid contacting therewith.

5. In a device of the class described, a tubular element for connection with a steam main or the like, a rod movable longitudinally of the tubular element, and a concave apertured element open on one side, carried by the rod and adapted to intercept impurities carried by fluid contacting therewith.

In testimony whereof I affix my signature.

CYRUS WILLIAM RICE.